United States Patent [19]
Carr et al.

[11] Patent Number: 5,610,340
[45] Date of Patent: Mar. 11, 1997

[54] INTEGRATED PRESSURE SENSOR WITH REMOTE POWER SOURCE AND REMOTE READ-OUT

[75] Inventors: William N. Carr, W. Milford; Subramanyam Chamarti, Passaic, both of N.J.

[73] Assignee: New Jersey Institute of Technology, Newark, N.J.

[21] Appl. No.: 494,097

[22] Filed: Jun. 23, 1995

[51] Int. Cl.$^6$ .................................................. G01L 9/12
[52] U.S. Cl. ........................................... 73/718; 73/724
[58] Field of Search .......................... 73/700, 718, 719, 73/723, 724, 727, 753, 754, 755, 146.5

[56] References Cited

U.S. PATENT DOCUMENTS

| | | | |
|---|---|---|---|
| 2,642,228 | 6/1953 | Machlet | 73/723 |
| 2,753,515 | 7/1956 | Rickner | 73/718 |
| 2,938,387 | 5/1960 | Hamilton | 73/755 |
| 3,580,081 | 5/1971 | Greenberge | 73/755 |
| 5,113,868 | 5/1992 | Wise et al. | 73/718 |
| 5,369,544 | 11/1994 | Mastrangelo | 73/718 |

*Primary Examiner*—Elizabeth L. Dougherty
*Assistant Examiner*—Max H. Noori
*Attorney, Agent, or Firm*—Ohlandt, Greeley, Ruggiero & Perle

[57] ABSTRACT

An integrated structure pressure sensor that is powered by induction and read out by induction and includes no integral power source, includes an oscillator circuit that is responsive to pressure variations. The oscillator circuit includes a capacitor having an electrode that is susceptible to induced stress and movement by an external source of pressure. A depletion mode semiconductor is preferably present in the circuit and includes source, drain and gate contacts. A first inductor is coupled between the source and drain contacts and is arranged to respond to an inductively induced voltage to enable current flow between the source and drain contacts. A second inductor in the circuit has a first terminal coupled to the source contact and a second terminal coupled to both the capacitor and the gate contact. The second inductor is arranged to respond to an inductively induced voltage to bias the semi-conductor for conduction. The power induction device is positioned external to the semiconductor structure and induces voltages in the first and second inductors, those voltages causing the circuit to oscillate at a frequency that is dependent upon a pressure level exerted on the capacitor by the external source of pressure. A sense circuit is positioned external to the semiconductor structure and is inductively coupled to the circuit for sensing the frequency of oscillation thereof as an indication of the pressure level.

10 Claims, 3 Drawing Sheets

INTEGRATED PRESSURE SENSOR WITH REMOTE POWER SOURCE AND REMOTE READ-OUT

FIELD OF THE INVENTION

This invention relates to integrated pressure sensors and, more particularly, to an integrated pressure sensor which requires no external connections for both power and read out purposes.

BACKGROUND OF THE INVENTION

The first miniature pressure transducer was described by Collins in 1967 for a bio-medical application. See Collins, "Miniature Passive Pressure Transducer for Implanting in the Eye", IEEE Transactions on Bio-Medical Engineering, Volume BME-14, pages 74–83, 1967. Collins' transducer used a hand wound inductor in a passive circuit. More recently, micromachining techniques have been used for similar LC passive circuits. Such systems achieve readout by using an absorption Q-meter Pressure monitoring devices such as that mentioned above, have been applied to a number of medical applications and, in particular, to intra-cranial pressure measurement. The majority of such devices have been implanted with leads protruding from the cranial cavity. Micro engineering techniques applied to such devices enable drastic reduction in their dimensions and allow for easy implantation anywhere on the human body.

Resonant RLC devices have been reported, based on silicon technology, in which the capacitance varies with an external fluid static pressure. The resonant frequency of the RLC devices varies with static fluid pressure, as a capacitance diaphragm electrode spacing is varied. When any such device is implanted, it is desired that the device be externally powered and that its readout be available without requiring a direct connection to the implanted device. Further, the device should exhibit extremely small physical size to assure the least interference with other biological structures or functions. Remote power and readout pressure monitoring devices also have application in nonmedical areas including the measurement of pressure levels in untethered robotic equipment, automotive tires, systems with high vibration levels where electrical interconnections are not reliable, and in certain extreme miniaturization applications where interconnect wires are too massive.

Silicon microstructure technology provides a basis for the manufacture of high performance sensors at low cost and in high volume. In addition, silicon devices are typically small, rugged stable and unaffected by biological fluids. The basic silicon technology is identical to that employed in semiconductor devices and involves the patterning and chemical etching of wafers of silicon to create three dimensional structures. Recent process improvements enable very precise dimensional control and the achievement of multiple layers that are etched and then fused together to form highly complex three dimensional structures.

It is therefore an object of this invention to provide an integrated structure pressure sensor that is powered from an external source, without requiring direct electrical connection.

It is another object of this invention to provide an integrated structure pressure sensor wherein read out is accomplished without a requirement for a direct electrical connection.

SUMMARY OF THE INVENTION

An integrated structure pressure sensor that is powered by induction and read out by induction and includes no integral power source, includes an oscillator circuit that is responsive to pressure variations. The oscillator circuit includes a capacitor having an electrode that is susceptible to induced stress and movement by an external source of pressure. A depletion mode semiconductor is preferably present in the circuit and includes source, drain and gate contacts. A first inductor is coupled between the source and drain contacts and is arranged to respond to an inductively induced voltage to enable current flow between the source and drain contacts. A second inductor in the circuit has a first terminal coupled to the source contact and a second terminal coupled to both the capacitor and the gate contact. The second inductor is arranged to respond to an inductively induced voltage to bias the semiconductor for conduction. The power induction device is positioned external to the semiconductor structure and induces voltages in the first and second inductors, those voltages causing the circuit to oscillate at a frequency that is dependent upon a pressure level exerted on the capacitor by the external source of pressure. A sense circuit is positioned external to the semiconductor structure and is inductively coupled to the circuit for sensing the frequency of oscillation thereof as an indication of the pressure level.

DETAILED DESCRIPTION OF THE INVENTION

Figure 1:
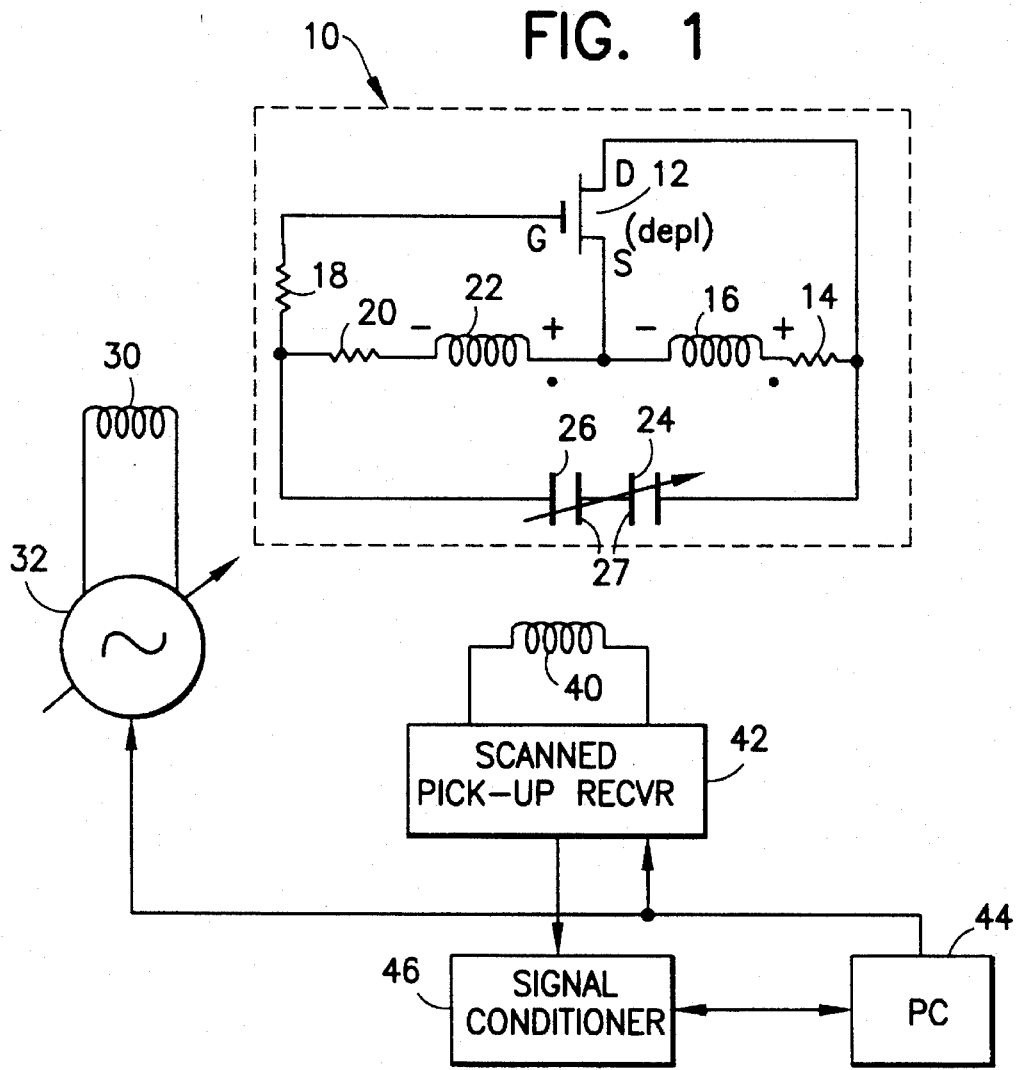
FIG. 1 is a diagram illustrating a circuit embodying the invention hereof which employs a depletion mode metal oxide semiconductor field effect transistor (MOSFET) device.

Referring now to FIG. 1, an integrated structure pressure sensor system includes a circuit with a depletion mode metal oxide field effect transistor (MOSFET) semiconductor transistor having source, drain and gate electrodes. The drain electrode is connected through a resistor 14 and inductor 16 to the source electrode. The gate electrode is connected through a resistor 18, resistor 20, and an inductor 22 to the source electrode. A dual capacitor structure comprising capacitors 24 and 26 is connected in parallel across inductors 16 and 22 and forms a portion of a tank circuit of a Hartley oscillator structure. A common plate 27 is shared by capacitors 24 and 26 and is structured to be responsive to an applied pressure to change the combined capacities thereof.

It is to be noted that there is no internal power supply connected in circuit 10. All power for circuit 10 is derived through inductive coupling between inductors 16 and 22 and an inductor 30 which is connected to a radio frequency (RF) power source 32. RF Power source 32 is controlled to provide a ramped RF power signal to an inductor 30. The RF signal which thus appears across inductor 30 is inductively coupled into inductor 16 and provides power to sustain oscillations within circuit 10. A portion of the RF signal from inductor 30 is also inductively coupled into inductor 22 and provides a bias signal between the gate and source electrodes of MOSFET semiconductor 12.

Pressure sensor circuit 10 is constructed so as to be implantable in an area where pressure is to be measured. Common plate 27 of capacitors 24 and 26 is constructed to move in response to an applied fluid pressure in an area where circuit 10 has been implanted. The variation in capacitance of capacitors 24 and 26 with pressure varies the oscillation frequency f of the LC tank circuit comprising capacitors 24, 26 and inductors 16 and 22. That oscillation frequency therefore varies in accordance with pressure and is detected by a pick-up loop 40 which is, in turn, coupled to a scanned pick-up receiver 42.

Receiver 42 is controlled to scan a frequency range of possible oscillator frequencies in accordance with expected pressure values. The scanning of pick-up receiver 42 is synchronized with the operation of RF power source 32 to enable rejection of unwanted external signals. Synchronization of receiver 42 and RF power source 32 is achieved via a timing signal derived from a personal computer or digital controller 44. When receiver 42 detects an oscillation signal from inductor 40, it locks onto the frequency and feeds the resulting signal to a signal conditioning circuit 46 where the frequency of the signal is converted to a digital count. That digital count is then fed to personal computer 44 where the count value is converted to a pressure value through a table look-up procedure.

To enable operation of circuit 10, with a depletion mode transistor, inductors 16 and 22 may be arranged so that the signal induced therein from coil 30 is in phase addition. Such configuration enables proper bias levels to be applied between the gate and source electrodes of MOSFET transistor 12 and enables a proper direction of current flow through transistor 12. The circuit of FIG. 1, with a depletion mode transistor, will also operate with the inductors 16 and 22 in phase opposition.

Figure 2:
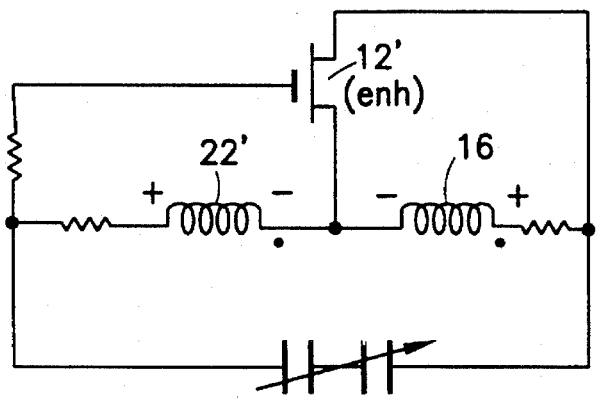
FIG. 2 is a circuit diagram of an oscillator circuit embodying the invention which utilizes an enhancement mode metal oxide semiconductor field effect transistor (MOSFET) device.

Referring to FIG. 2, a second embodiment of circuit 10 is illustrated which employs an enhancement mode MOSFET transistor 12'. In other respects, the circuit of FIG. 2 is identical to that of FIG. 1, except that the phasing of inductor 22' has been reversed so that a signal induced therein from coil 30 causes a bias potential of proper polarity for an enhancement mode MOSFET transistor to be applied between the gate and source of transistor 12'.

RF power source 32 is synchronized by personal computer 44 to apply a ramped voltage frequency signal via inductor 30 to sensor circuit 10. The frequency of the ramped signal (e.g. 10 MHz) is low with respect to the frequency of oscillation of circuit 10 (e.g. 100 MHz).

Figure 3:
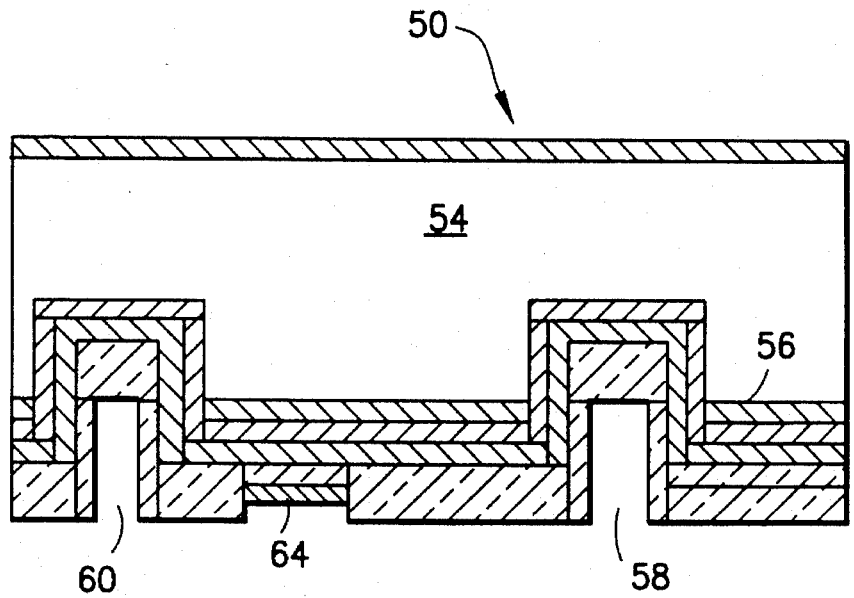
FIG. 3 is a sectional view of a top wafer forming a portion of an integrated structure embodying the invention.
Figure 4:
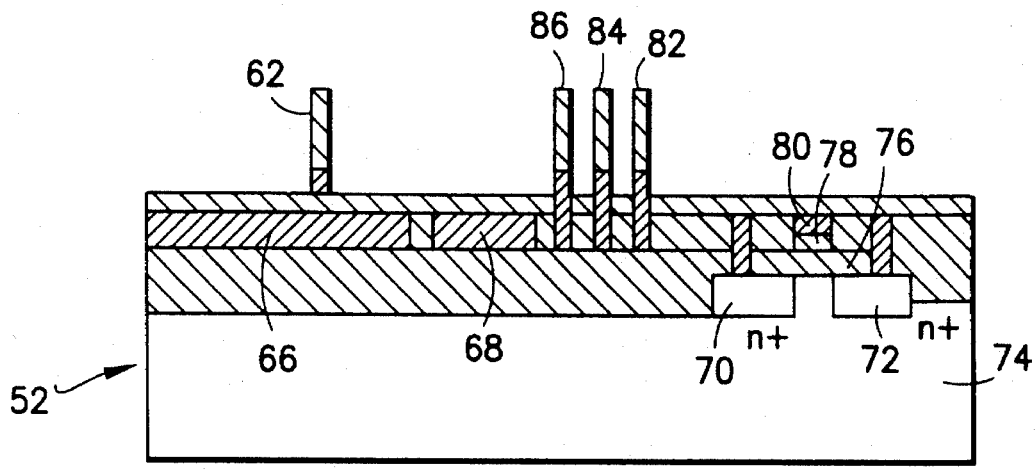
FIG. 4 is a sectional view of a bottom wafer which comprises a portion of the integrated structure embodying the invention.
Figure 5:
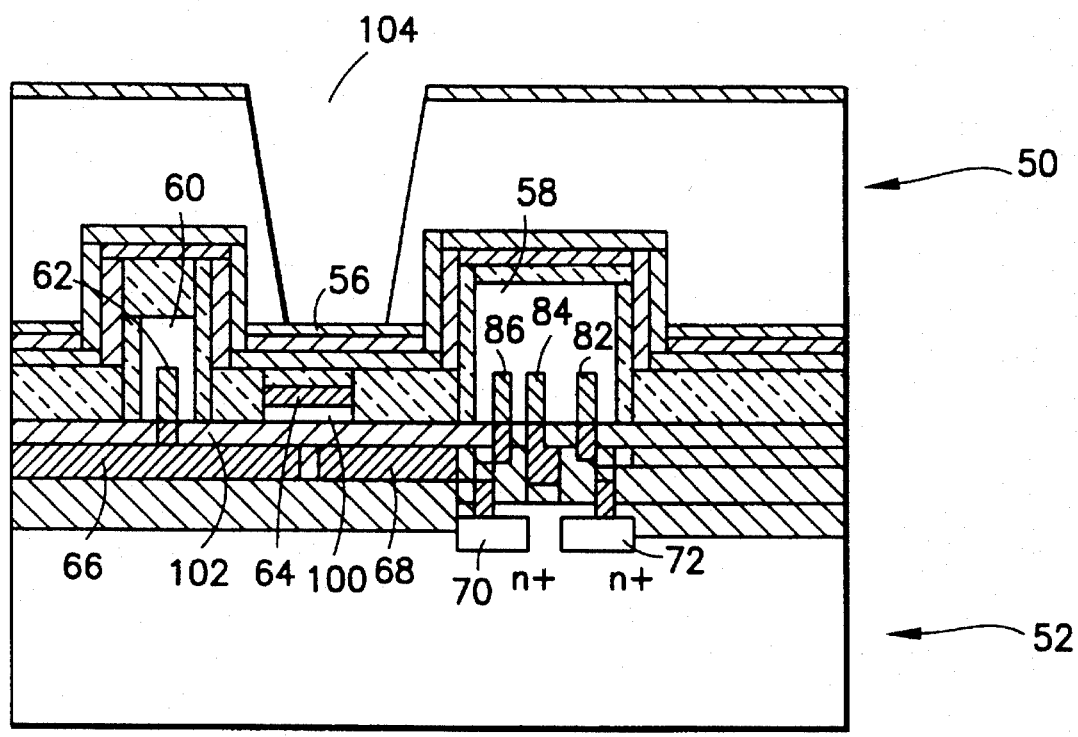
FIG. 5 is a fully assembled sectional view of the integrated structure embodying the invention.

Referring to FIGS. 3–5, the semiconductor structure of circuit 10 will be described. A top wafer 50 (FIG. 3) performs a number of functions, i.e., it functions as a cover which isolates various circuit structures from the fluid whose pressure is being sensed; it includes common plate 27 of capacitors 24, 26 and provides a grooved recess to enable alignment of top wafer 50 with bottom wafer 52 (See FIG. 4).

Bottom wafer 52 holds the MOSFET transistor as well as the multiple coil turns which form inductors 16 and 22 (FIG. 1). In addition, bottom wafer 52 includes an extension which mates with a recess in top wafer 50 that enables alignment of top and bottom wafers 50 and 52.

Top wafer 50 comprises a silicon substrate 54 on which a silicon nitride layer 56 has been applied. Further layers of silicon dioxide, silicon nitride and glass reside on the lowermost surface of top wafer 50. A trench 58 is formed in the lowermost surface of top wafer 50 and, when top wafer 50 is bonded to bottom wafer 52, encompasses the coils of inductors 16 and 22. A recess 60 mates with a copper extension 62 that extends upwardly from lower wafer 52 (FIG. 4) to enable alignment of top wafer 50 and bottom wafer 52. A recessed aluminum layer 64 provides common plate 27 for capacitors 24 and 26. In FIG. 4, aluminum layers 66 and 68 form the remaining plates of capacitors 24 and 26.

MOSFET transistor 12 is configured (in FIG. 4) by source and drain regions 70 and 72 that are formed in substrate material 74. A silicon dioxide layer 76 spans between regions 70 and 72 and supports a metal oxide layer 78. A gate electrode 80 is positioned on metal oxide layer 78. Similarly, source and drain contacts are configured in contact with source and drain regions 70 and 72.

A plurality of copper turns 82, 84 and 86 extend upwardly from bottom wafer 52 and form inductors 16 and 22. Turns 82, 84 and 86 are configured in a square shape on the uppermost surface of bottom wafer 52 and are center tapped (not shown). The center tap is connected to source region 70.

Turning to FIG. 5, top wafer 50 has been assembled onto bottom wafer 52, with the glass layer on top wafer 50 acting as a bonding agent. Copper turns 82, 84 and 86 extend into trench 58. Similarly, copper extension 62 protrudes upwardly into recess 60 and acts as an alignment mechanism for assuring proper orientation of top wafer 52 lower to bottom wafer 52. Conductor 64 (i.e. common plate 27 of capacitor pair 24, 26) is capacitively coupled to conductors 66 and 68 (mating plates of capacitor pair 24, 26) via an air gap 100 and a silicon dioxide layer 102. The slightly doped surrounding oxide provides adequate conductivity to eliminate charge buildup on floating conductor 64.

Subsequent to assembly of top wafer 50 to bottom wafer 52, a trench 106 is etched into top wafer 50 to expose the upper surface of silicon nitride layer 56. When the structure shown in FIG. 5 is immersed in a fluid medium, the fluid fills trench 104 and applies pressure to conductor 64 via the intervening layers of silicon nitride, silicon dioxide, and silicon nitride which, together, form a diaphragm. The pressure acts on the diaphragm (including conductor 64) by causing it to deform into air gap 100, thereby altering the distance between itself and conductor plates 66 and 68—and thus the capacitance of capacitors 24 and 26. By splitting the plates of capacitors 24 and 26 in the manner shown, electrical connections need only be made to conductors 66 and 68 and no electrical connection is required to conductor 64. Thus, all wiring occurs in bottom wafer 52.

The foregoing invention can also be implemented with gallium arsenide FFT transistors (e.g. MESFET) to obtain higher sensitivity and power levels. For gallium arsenide transistors, the circuit concepts remain the same as stated for silicon MOSFET transistors.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. An integrated structure pressure sensor system that is powered by induction and read out by induction, said structure including a circuit comprising:

capacitor means in said circuit and including at least one electrode that is susceptible to induced stress and movement by an external source of pressure;

a transistor in said circuit, including source, drain and gate contacts;

a first inductor in said circuit, connected between said source and drain contacts and arranged to respond to an inductively induced voltage to enable current flow between said source and drain contacts;

a second inductor in said circuit, having a first terminal coupled to said source contact and a second terminal coupled to both said capacitor means and said gate contact, said second inductor arranged to respond to an inductively induced voltage to bias said transistor for conduction;

said capacitor means, first inductor, transistor and second inductor comprising a resonant oscillation circuit;

said system further comprising:

induction means external to said structure for inducing voltages in said first inductor and said second inductor, said voltages causing said circuit to oscillate at a resonant frequency that is dependent on a pressure level exerted on said capacitor means by said external source of pressure; and sense means, external to said structure and inductively coupled to said circuit, for sensing said resonant frequency as an indication of said pressure level.

2. An integrated structure pressure sensor system as recited in claim 1, wherein said transistor is a depletion mode field effect transistor and said first inductor and second inductor are arranged to induce additive voltages in said circuit.

3. An integrated structure pressure sensor system as recited in claim 1, wherein said transistor is an enhancement mode field effect transistor and said first inductor and second inductor are arranged to induce subtractive voltages in said circuit.

4. An integrated structure pressure sensor system as recited in claim 1, wherein said capacitor means is coupled between said gate and drain contacts and in parallel with said first inductor and said second inductor, said capacitor means including at least three plates, a first plate coupled to said gate contact, a second plate coupled to said drain contact and a third plate separated from said first plate and second plate by a dielectric medium.

5. An integrated structure pressure sensor system as recited in claim 4, wherein said structure further comprises:

a top wafer including an upper surface, a bottom interface plane having an insulating region and said third plate in contact with said insulating region;

a bottom wafer bonded to said bottom interface plane of said top wafer and including said first plate and second plate disposed in positional opposition to said third plate and separated therefrom by said dielectric medium, and further including said semiconductor.

6. An integrated structure pressure sensor system as recited in claim 5, wherein said upper surface of said top wafer includes an opening which extends through a thickness of said top wafer to said insulating region in a vicinity of said third plate to enable pressure of a fluid in said opening to be transmitted to said third plate and to alter a distance between said third plate and said first and second plates, and said resonant frequency of oscillation.

7. An integrated structure pressure sensor system as recited in claim 6, wherein said bottom wafer includes an upper surface on which resides conductive windings comprising said first inductor and second inductor and an alignment protrusion, and wherein said bottom interface plane of said top wafer includes an inset which mates with said conductive windings and an alignment inset which mates with said alignment protrusion to enable alignment of said top wafer and bottom wafer during fabrication.

8. An integrated structure pressure sensor system as recited in claim 1 wherein said induction means generates a varying level oscillation voltage for induction into said first inductor and second inductor.

9. An integrated structure pressure sensor system as recited in claim 8, wherein said sense means comprises a swept spectrum receiver having a frequency range that encompasses an expected range of resonant oscillation frequencies of said circuit.

10. An integrated structure pressure sensor system as recited in claim 9, further comprising:

processor means for concurrently energizing said induction means and said sense means to synchronize operation of said sense means to a time when said circuit is oscillating.

\* \* \* \* \*